United States Patent
Lee

(10) Patent No.: US 7,921,250 B2
(45) Date of Patent: Apr. 5, 2011

(54) METHOD TO SWITCH THE LOCK-BITS COMBINATION USED TO LOCK A PAGE TABLE ENTRY UPON RECEIVING SYSTEM RESET EXCEPTIONS

(75) Inventor: Van Hoa Lee, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 1549 days.

(21) Appl. No.: 10/902,607

(22) Filed: Jul. 29, 2004

(65) Prior Publication Data

US 2006/0036789 A1 Feb. 16, 2006

(51) Int. Cl.
G06F 12/00 (2006.01)
G06F 12/14 (2006.01)
G06F 13/00 (2006.01)
G06F 13/28 (2006.01)

(52) U.S. Cl. .................. 710/200; 711/163; 711/164
(58) Field of Classification Search ........... 710/200; 711/163–164; 714/13
See application file for complete search history.

(56) References Cited

U.S. PATENT DOCUMENTS

| | | | | |
|---|---|---|---|---|
| 4,823,261 A * | 4/1989 | Bank et al. | ...... | 711/152 |
| 5,175,829 A * | 12/1992 | Stumpf et al. | ...... | 712/203 |
| 5,398,330 A * | 3/1995 | Johnson | ...... | 714/15 |
| 5,574,922 A * | 11/1996 | James | ...... | 712/220 |
| 5,596,733 A * | 1/1997 | Worley et al. | ...... | 712/244 |
| 5,682,537 A * | 10/1997 | Davies et al. | ...... | 710/200 |
| 5,778,423 A * | 7/1998 | Sites et al. | ...... | 711/118 |
| 5,797,019 A * | 8/1998 | Levine et al. | ...... | 710/262 |
| 5,852,747 A * | 12/1998 | Bennett et al. | ...... | 710/40 |
| 6,031,757 A * | 2/2000 | Chuang et al. | ...... | 365/185.04 |
| 6,145,094 A * | 11/2000 | Shirriff et al. | ...... | 714/11 |
| 6,185,668 B1 * | 2/2001 | Arya | ...... | 712/23 |
| 6,230,230 B1 * | 5/2001 | Joy et al. | ...... | 710/200 |
| 6,243,786 B1 * | 6/2001 | Huang et al. | ...... | 710/262 |
| 6,282,637 B1 * | 8/2001 | Chan et al. | ...... | 712/223 |

(Continued)

FOREIGN PATENT DOCUMENTS

EP 543560 A2 * 5/1993

(Continued)

OTHER PUBLICATIONS

"NN8803468: Hardware Lock Bits Stored in Array Chip", Mar. 1, 1988, IBM, IBM Technical Disclosure Bulletin, vol. 30, Iss. 10, pp. 468-469.*

(Continued)

*Primary Examiner* — Faisal M Zaman
(74) *Attorney, Agent, or Firm* — Yee & Associates, P.C.; Diana R. Gerhardt

(57) ABSTRACT

A method, system, and computer instructions for changing the lock-bits combination used to lock a resource upon receiving a system reset exception. The present invention forces the software to use different lock-bits combinations based on the number of occurrences of system reset exceptions. When a system reset exception is received, a system reset exception bit value in a special purpose register is updated based on the history of system reset exception occurrences. Based on the updated value in the system reset exception bit, the lock-bits combination for locking a resource is changed to allow the data processing system to reuse the resource with bad lock-bits. In this manner, the deadlocked resource is resolved, and a processor is not able to obtain an indefinitely held lock on system resources caused by system reset exceptions.

36 Claims, 3 Drawing Sheets

U.S. PATENT DOCUMENTS

| | | | |
|---|---|---|---|
| 6,308,243 B1 * | 10/2001 | Kido | 711/147 |
| 7,137,031 B2 * | 11/2006 | Taguchi | 714/13 |
| 7,496,574 B2 * | 2/2009 | Walker | 1/1 |
| 2002/0129182 A1 * | 9/2002 | Coffey | 710/200 |
| 2002/0133655 A1 * | 9/2002 | Falik et al. | 710/200 |
| 2003/0221071 A1 * | 11/2003 | McKenney et al. | 711/152 |
| 2004/0243792 A1 * | 12/2004 | Stoodley | 712/244 |
| 2005/0038969 A1 * | 2/2005 | Schrodinger et al. | 711/164 |
| 2005/0080963 A1 * | 4/2005 | Schopp | 710/200 |
| 2005/0149711 A1 * | 7/2005 | Zimmer et al. | 712/244 |
| 2008/0215841 A1 * | 9/2008 | Bolotin et al. | 711/164 |
| 2009/0063802 A1 * | 3/2009 | Johnson et al. | 711/164 |

FOREIGN PATENT DOCUMENTS

| | | | |
|---|---|---|---|
| EP | 712076 A2 * | 5/1996 | |
| JP | 01300366 A * | 12/1989 | |
| JP | 03048962 A * | 3/1991 | |
| JP | 04127261 A * | 4/1992 | |
| JP | 06075789 A * | 3/1994 | |
| JP | 09330241 A * | 12/1997 | |
| JP | 2001142861 A * | 5/2001 | |

OTHER PUBLICATIONS

"NN9108329: Modified Multiple Locking Facility", Aug. 1, 1991, IBM, IBM Technical Disclosure Bulletin, vol. 34, Iss. 3, pp. 329-332.*

Lortz et al., "Semaphore queue priority assignment for real-time multiprocessor synchronization," Oct. 1995, IEEE, IEEE Transactions on Software Engineering, vol. 21, No. 10, pp. 834-844.*

Johnson et al., "A prioritized multiprocessor spin lock," Sep. 1997, IEEE, IEEE Transactions on Parallel and Distributed Systems, vol. 8, No. 9, pp. 926-933.*

Herlihy et al., "Transactional Memory: Architectural Support for Lock-free Data Structures," May 16-19, 1993, IEEE, Proceedings of the 20th Annual International Symposium on Computer Architecture, pp. 289-300.*

* cited by examiner

METHOD TO SWITCH THE LOCK-BITS COMBINATION USED TO LOCK A PAGE TABLE ENTRY UPON RECEIVING SYSTEM RESET EXCEPTIONS

BACKGROUND OF THE INVENTION

1. Technical Field

The present invention relates generally to an improved data processing system. In particular, the present invention is directed to a method, apparatus, and computer instructions for handling system reset exceptions (SREs).

2. Description of Related Art

In a PowerPC processor, translation of virtual addresses to physical addresses may be performed using a Memory Management Unit (MMU). PowerPC processor is a product of Motorola, Inc. or IBM Corporation. The MMU utilizes page tables comprised of multiple entries called page-table entries (PTEs) to facilitate translation of virtual memory into real memory. When a process requests a system resource by presenting an address, the MMU automatically scans the page table for a matching page table entry. When a match is found, the virtual memory is translated to physical memory for use by the process.

Page table entries are used to store physical page numbers and other defining information for corresponding virtual addresses. A physical page number and a page offset are combined to form a complete physical address. The page table entry has bit-fields which include attribute information, such as if the page has been written to, when it was last used, and what kind of processes may read and write to it. The page table entry may also have specific bits reserved for software to implement a software locking mechanism to establish exclusive ownership of the page table entry for entry-update serialization.

A problem with using such a locking mechanism arises when a process has acquired the ownership of a PTE and a non-maskable system reset exception (SRE) occurs. An SRE is similar to a virtual pressing of the "reset" button on a computer. If an SRE occurs when a process has acquired a PTE but not yet released the ownership, the software lock obtained by the processor will be held indefinitely and become a deadlock. That is, even though the processor has received the SRE, the page table entry will still indicate that the processor has a lock on a shared resource if the resource call is prematurely ended. Since the resource call cannot be completed, the lock will never be released. This situation causes a problem in that other processes or threads will not be able to obtain access to system resources locked by the processor. These other processes will become "starved" by continuing to try to obtain a lock on the system resources, i.e. spinning on the lock, and never being able to perform the necessary work requiring the lock on the system resource.

Without knowing the specific page table entry that is locked, software in some systems must rely on the brute-force method to search the page table for the locked page table entry and release it. An example of such as system is the JS20 Blade Server, a product of IBM Corporation. As the page table may be very large in size, the brute-force method may result in a time-extensive search just to find that one locked page table entry.

Therefore, it would be advantageous to have an improved method, apparatus, and computer instructions for avoiding deadlocks due to non-maskable system reset exceptions.

SUMMARY OF THE INVENTION

The present invention provides a method, system, and computer instructions for changing the lock-bits combination used to lock a resource upon receiving a system reset exception. The mechanism of the present invention forces the software to use different lock-bit combinations based on the number of occurrences of system reset exceptions. When a system reset exception is received, a system reset exception bit value in a special purpose register is updated based on the history of system reset exception occurrences. Based on the updated value in the system reset exception bit, the software employs a new lock-bits combination for the resource update process. During the resource update process, if the software encounters a previously locked resource, that resource will be properly relocked, updated, and released. Thus, the deadlocked resource is removed and the data processing system is able to reuse that resource. In this manner, a processor is not able to obtain an indefinitely held lock on the system resources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
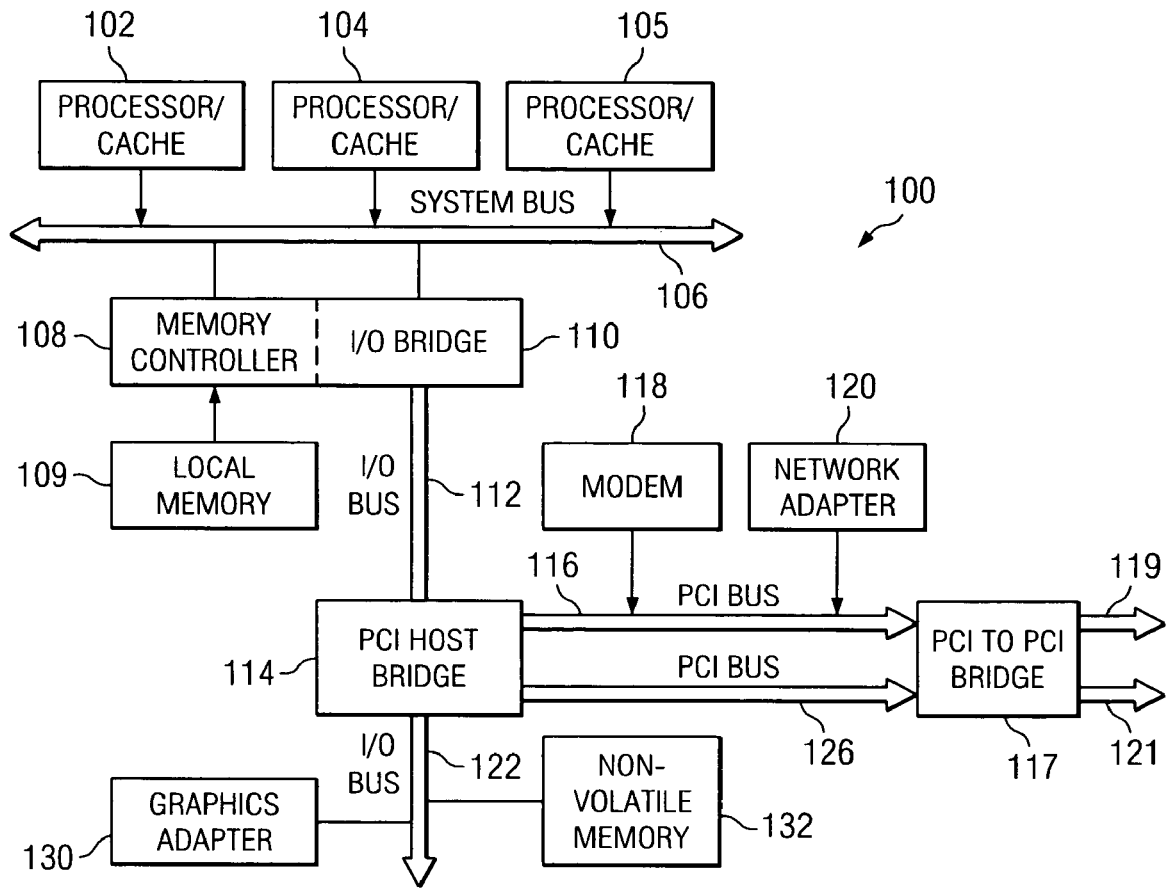
FIG. 1 is a block diagram of a data processing system in which the present invention may be implemented.

Referring now to FIG. 1, a block diagram of a data processing system in which the present invention may be implemented is depicted. Data processing system 100 may be a symmetric multiprocessor (SMP) system including a plurality of processors/caches 102, 104, and 105 connected to system bus 106. Although only three processors are depicted, the present invention may be implemented using a data processing system with other numbers of processors. Alternatively, a single processor system may be employed. Also connected to system bus 106 is memory controller 108, which provides an interface to local memory 109. I/O bus bridge 110 is connected to system bus 106 and provides an interface to I/O bus 112. Memory controller 108 and I/O bus bridge 110 may be integrated as depicted.

Peripheral component interconnect (PCI) host bridge 114 is connected to I/O bus 112 provides an interface to PCI local busses 116 and 126. A number of PCI-compliant adapters may be connected to PCI local busses 116 and 126. PCI-to-PCI bridge 117 provides an interface to PCI bus 119 and PCI bus 121. Typical PCI bus implementations will support four PCI expansion slots or add-in connectors. Communications links to other systems and devices may be provided through modem 118 and network adapter 120 connected to PCI local bus 116 through add-in boards. In this manner, data processing system 100 allows connections to multiple network computers. A memory-mapped graphics adapter 130 and non-volatile memory 132 may also be connected to I/O bus 122 as depicted, either directly or indirectly.

The data processing system depicted in FIG. 1 may be implemented using various commercially available computer systems. For example, data processing system 100 may be implemented using IBM eServer pSeries JS20 Blade system, a product of International Business Machines Corporation in Armonk, N.Y., running the Advanced Interactive Executive (AIX) operating system or LINUX operating system.

Those of ordinary skill in the art will appreciate that the hardware depicted in FIG. 1 may vary. For example, other peripheral devices, such as hard disk and optical disk drives and the like, also may be used in addition to or in place of the hardware depicted. The depicted example is not meant to imply architectural limitations with respect to the present invention.

The present invention provides a method, apparatus, and computer instructions for avoiding deadlocks when system reset exceptions occur. The present invention recognizes that software may obtain a lock on a shared resource, and thus allow exclusive access to a shared resource until the lock is released. The software obtains a lock using a combination of two bits to implement the locking mechanism. Although two bits are currently available to implement the locking mechanism, existing systems only utilize one of the bits. The other bit is left unused.

The present invention also recognizes that in certain circumstances, such as when a system reset exception occurs during the call to the shared resource, the lock is not released once the call is complete. For example, in the prior art systems, the occurrence of the system reset exception would cause the processors to immediately go to the operating system's reset handler routine. If the processor had a lock on a system resource at the time of the reset, the lock would not be released. As a result, the processor would continue to have a lock on the resource indefinitely so that no other processors in the system would be able to access the locked resource. These processors would continue to "spin" on the lock and would become starved due to an inability to complete work assigned to them.

The mechanism of the present invention addresses this problem by utilizing the available lock-bits in the page table entry to resolve the deadlocked page table entry condition. In this manner, no brute-force page table search is needed to release the locked page table entry. With the present invention, two bits are used for the locking mechanism in these illustrative examples. The present invention forces the software to use different lock-bits combinations based on the number of occurrences of system reset exceptions. A page table entry will be in a locked state if the lock-bits for the page table entry are set to the designated combination based on the history of system reset exception occurrences. In this manner, a processor is not able to obtain an indefinitely held lock on the system resources. Thus, processor starvation is avoided.

Prior to the implementation of this process, the entire page table is set aside and all page table entries are cleared. Two bits in a special purpose register of the PowerPC processor are also cleared in order to indicate that no system reset exception has occurred. These two bits, or "system reset exception occurrence bits" (SREB), are read by the software to determine the lock-bits combination to use for locking any particular PTE entry. The lock-bits combination is used to set the lock-bit field of a PTE entry to establish exclusive ownership. As the system reset exceptions occur, the SREB[0:1]) is incremented (00 to 01, etc.) to reflect the number of system reset exceptions that have occurred. A PTE entry whose lock-bit field matches the lock-bits combination selection based on the current value of SREB[0:1] is considered properly locked and owned by a processor. Otherwise, the PTE entry is not locked and owned by a processor (even though it might be properly locked and owned with a previous lock-bits combination). When a PTE-update process encounters a previously locked PTE (wrong lock-bit combination with respect to the current value of SREB[0:1]), the process is not only able to lock the PTE with the right lock-bits combination to establish ownership and update the PTE, but it may also fix a deadlock PTE with the release of the PTE (writing 00 to the lock-bit field) after the PTE is updated.

With the two bits for SREB, there are four possible combinations. For example, the possible combinations are: 0b00, 0b01, 0b10, and 0b11. The two bits are initially set cleared and set to 0b00. When the first system reset exception occurs, the system reset handler changes the two bits in the special purpose register to 0b01. If a second system reset exception occurs, these two bits are again changed to 0x10, or 0b10. Finally, if a third system reset exception occurs, these two bits are changes to 0b11. The system reset handler will then modify itself so that any future system reset exception will always keep these two bits at 0b11. Therefore, the following state table may be generated:

| SREB[0:1] | Number of Occurred Reset Exceptions |
| --- | --- |
| 0b00 | no reset |
| 0b01 | one reset |
| 0b10 | two resets |
| 0b11 | three or more resets |

When the system firmware handler sees the first and second system reset exceptions, the program control is transferred back to the operating system reset handler. However, for the third system reset exception and beyond, the system reset handler may reboot the system instead of going back to the operating system reset handler.

Once the reset exception occurrence is identified in the system reset exception occurrence bit, the page table update process will need to use a new lock-bit combination when attempting to establish exclusive ownership of a PTE. For that purpose, the software reads the SREB[0:1] from the special purpose register. Based on the value of the SREB[0:1], the corresponding page table entry lock-bits combination is used to lock a page table entry. If the two page table entry lock-bits are named PTE_LOCK[0:1], for example, then the software may use PowerPC atomic instructions to update the PTE_LOCK[0:1] as shown in the following table:

| SREB[0:1] | PTE LOCK[0:1] |
| --- | --- |
| 0b00 | 0b01 |
| 0b01 | 0b10 |
| 0b10 | 0b11 |
| 0b11 | xxxx |

The "xxxx" value in the PTE_LOCK[0:1] indicates that the PTE update process will never see the SREB[0:1] combination since the system reset handler will reboot the system in that case.

Therefore, if a PTE is locked (e.g., PTE_LOCK[0:1]= 0b01), and a first system reset exception occurs, this PTE will not be treated as a deadlocked PTE when the software reuses it for a new virtual address translation, because now SREB[0:1]=0b01 and PTE_LOCK[0:1]=0b10. Similarly, after second system reset exception has occurred, a deadlocked PTE with PTE_LOCK[0:1]=0b10 will be reusable since the page table entry update process will update the lock-bits to PTE_LOCK[0:1]=0b11.

By reusing the PTE, the software also successfully manages to release the PTE. Thus, no page table search is needed to release the locked PTE and the deadlocked PTE condition is resolved.

It must be noted that although the present invention is described in the context of a page table entry lock, the present invention may be applicable to any type of software lock. For example, a processor uses a software lock combination "A" to establish exclusive ownership of a resource when SREB[0:1]= 0b00. If a system reset exception occurs, the present invention allows a processor to use a lock combination "B" to establish exclusive ownership of the resource, even though the resource was locked with lock combination "A" (lock combination "A" is now considered to be an incorrect combination since it does not indicate a properly established ownership of the resource under the new SREB[0:1]=0b01).

Figure 2:
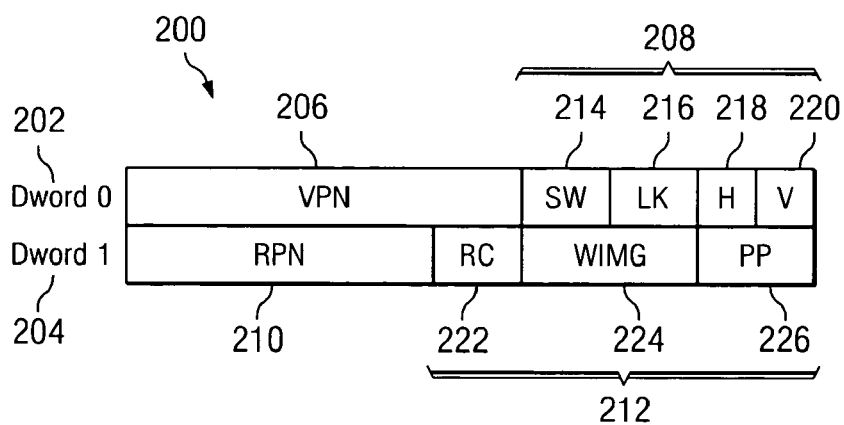
FIG. 2 is a known page table entry format illustrating the bits used by the software to implement the locking mechanism.

Turning next to FIG. 2, a known page table entry format illustrating bits used by the software to implement the locking mechanism is shown. In this example, the page table entry 200 illustrated comprises two 64-bit doublewords, Dword 0 202 and Dword 1 204. The page table entry shown in FIG. 2 may be implemented in a data processing system, such as data processing system 100 in FIG. 1.

In the illustrated example, Dword 0 202 comprises virtual page number (VPN) field 206, and bit fields 208. Dword 1 204 comprises real page number (RPN) field 210 and bit fields 212. VPN field 206 contains the high-order bits of virtual page address. RPN field 210 contains the high-order bits of the physical page address. As mentioned previously, bit fields are used to store attribute information describing a page table entry, such as if the page has been written to, when it was last used, and what kind of processes may read and write to it. For example, bit fields 208 in Dword 0 202 include software usage (SW) bits 214, page table entry lock-bits (LK) 216, hash function identifier bit (H) 218, and valid bit (V) 220. Bit fields 212 in Dword 1 204 include reference/change bit (RC) 222, storage control bits (WIMG) 224, and page protection bits (PP) 226.

In particular, page table entry lock-bits 216 within Dword 0 202 are used as a locking mechanism, such that another process or thread waiting to acquire the resource is blocked while another process or thread is using the resource. For example, prior to updating a page table entry, page table entry lock-bits 216 may be used to lock page table entry 200 in order to establish exclusive ownership for serialization. By setting the lock-bits on the page table entry, other processes are prevented from accessing or updating the resource at the same time.

Figure 3:
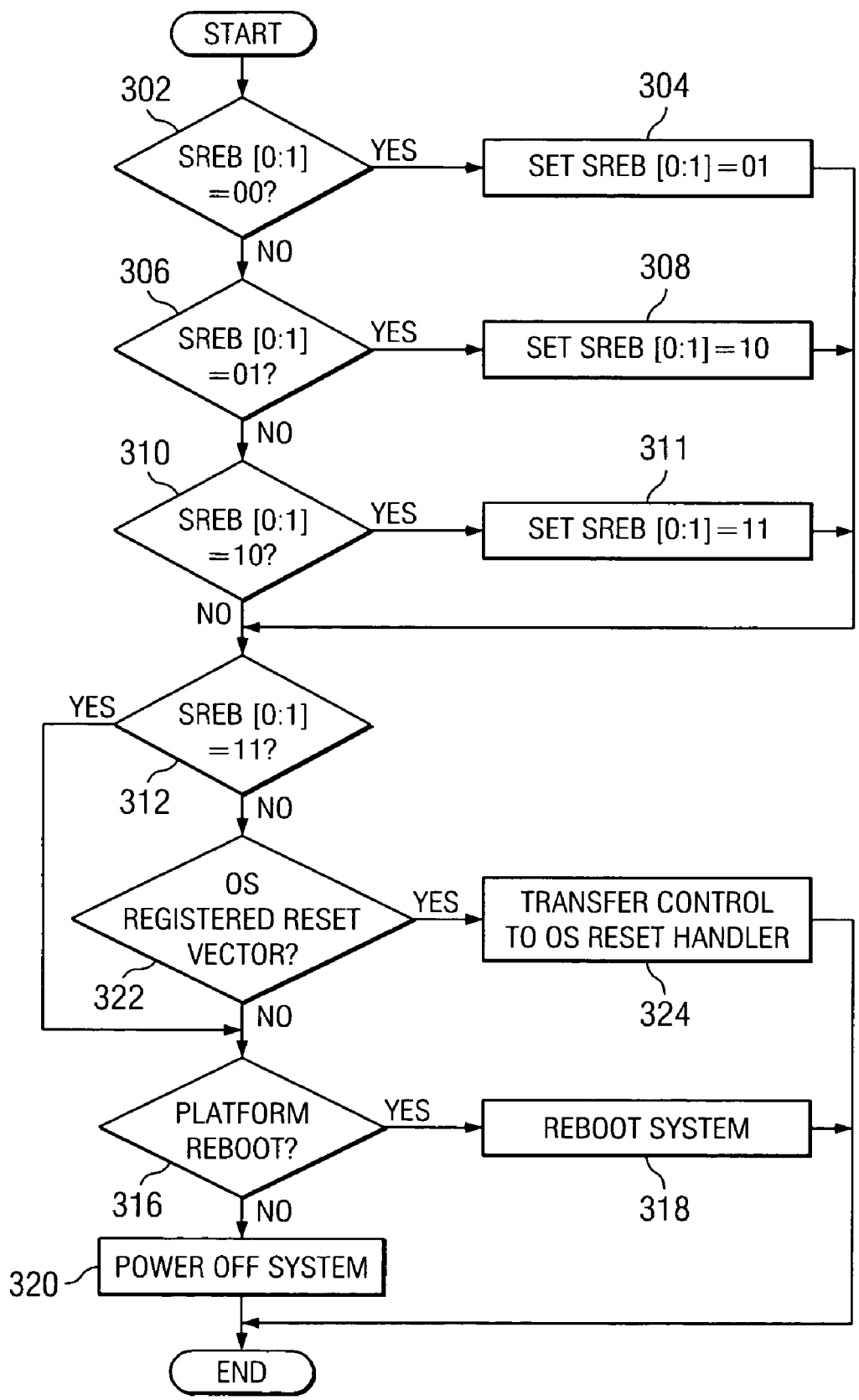
FIG. 3 is a flowchart of a process for establishing the lock-bit combination to be used to lock a page table entry in accordance with a preferred embodiment of the present invention.

Turning now to FIG. 3, a flowchart of a process for establishing the lock-bit combination to be used to lock a page table entry in accordance with a preferred embodiment of the present invention is shown. This process is performed by the software reset handler in response to the occurrence of a system reset exception. The process illustrated in FIG. 3 may be implemented in a data processing system, such as data processing system 100 in FIG. 1.

When a system reset exception has occurred, the process begins with determining if the system reset exception bit value (SREB[0:1]) is 00 (step 302). If so, the software reset handler changes the SREB[0:1] value to 01 (step 304), with the process continuing to step 312.

Turning back to step 302, if the SREB[0:1] value is not 00, a determination is made as to whether the SREB[0:1] value is 01 (step 306). If so, the software reset handler changes the SREB[0:1] value to 10 (step 308), with the process continuing to step 312.

Turning back to step 306, if the SREB[0:1] value is not 01, a determination is made as to whether the SREB[0:1] value is 10 (step 310). If so, the software reset handler changes the SREB[0:1] value to 11 (step 311), with the process continuing to step 312.

Turning back to step 310, if the SREB[0:1] value is not 10, a determination is made as to whether the SREB[0:1] value is 11 (step 312). If it is determined that the SREB[0:1] value is 11, a determination is made as to whether the platform policy is to perform a platform reboot (step 316). This determination is made by the firmware which implements a default platform reboot policy. When an operating system is up and running, the operating system may request to change the default platform reboot policy to instead power off the system. If the platform reboot should be performed, a system reboot is executed (step 318). If the platform reboot should not be performed, the system is shut down (powered off) (step 320).

Turning back to step 312, if it is determined that the SREB [0:1] value is not 11, a determination is made as to whether the operating system has registered its reset handler's address to the system reset exception handler (step 322). If so, the system reset handler transfers control to the operating system reset handler (step 324), with the process terminating thereafter. If it is determined that the operating system has not registered its reset handler's address to the system reset exception handler, the process continues at step 316.

Figure 4:
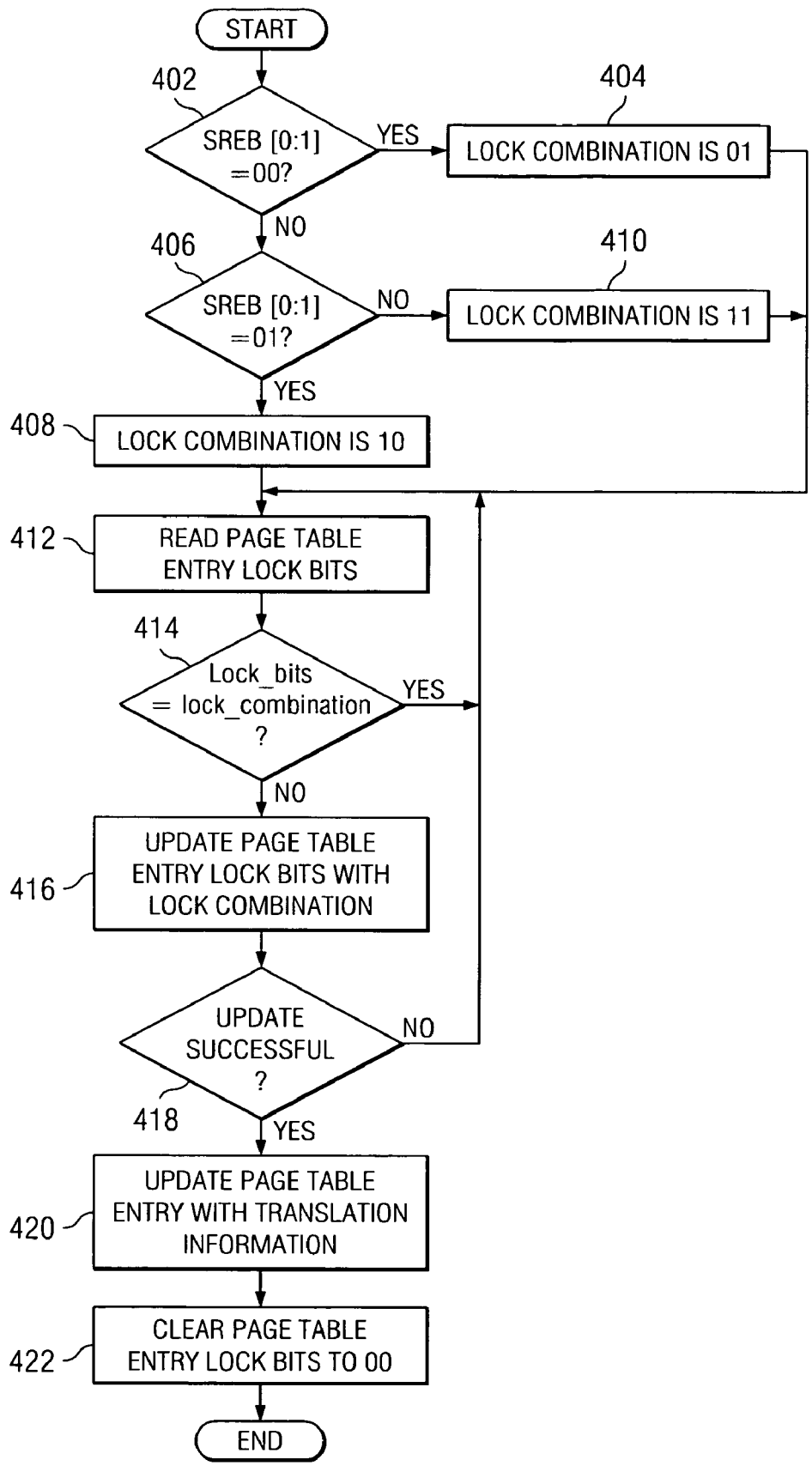
FIG. 4 is a flowchart of a process for identifying the page table entry lock combination to use based on the system reset exception bit and updating the page table entry in accordance with a preferred embodiment of the present invention.

FIG. 4 is a flowchart of a process for identifying the page table entry lock combination to use based on the system reset exception bit and updating the page table entry in accordance with a preferred embodiment of the present invention. This process may be performed when the operating system wants to establish a new virtual address translation into the page table. The process illustrated in FIG. 4 may be implemented in a data processing system, such as data processing system 100 in FIG. 1.

The process begins with determining if the SREB[0:1] value in the special purpose register is 00 (step 402). If so, the page table entry lock combination for locking a PTE is identified as 01 (step 404). For instance, if it is determined that the SREB[0:1] value is 00, a page table entry is considered being locked when it has its PTE_LOCK[0:1]=0b01.

Turning back to step 402, if the SREB[0:1] value is not 00, a determination is made as to whether the SREB[0:1] value is 01 (step 406). If so, the page table entry lock combination for locking a PTE is identified as 10 (step 408). For instance, if it is determined that the SREB[0:1] value is 01, a page table entry is considered being locked when it has its PTE_LOCK[0:1]=0b10.

Turning back to step 406, if the SREB[0:1] value is not 01, the page table entry lock combination for locking a PTE is identified as 11 (step 410). For instance, if it is determined that the SREB[0:1] value is not 01, the page table entry is considered being locked when it has its PTE_LOCK[0:1]= 0b11.

Once the right lock combination has been determined, the firmware reads the lock-bits in the page table entry (step 412). A determination is then made as to whether the current lock-bits read from the page table entry match the right lock combination identified using the SREB[0:1] value (step 414). This step is performed to determine if the page table entry is currently locked (i.e., if the page table entry is in the middle of an update). If there is a match, the process returns to step 412.

In this case, the PTE is currently owned by another processor that has properly locked the PTE. Therefore, this processor will need to wait for the PTE to be released. As the lock-bits will be changed by the other processor which releases the PTE, this processor will see a different reading at a later time.

If the current lock-bits read from the page table entry and the lock combination identified using the SREB[0:1] value do not match, the page table entry lock-bits are updated with the lock combination identified based on the SREB[0:1] value (step 416) while other bits of the entry are preserved. This update is performed with a PowerPC atomic store instruction. The atomic store instruction makes sure that in case there are two or more processor attempts to perform the same update at the same time, only one processor will succeed, and the others processors will fail. For example, if the page table entry lock-bits are currently set to 01 (i.e., PTE_LOCK[0:1]= 0b01), and the lock combination to use based on the SREB [0:1] value is 10, the page table entry lock-bits will be updated to 10 (e.g., PTE_LOCK[0:1]=0b10). The software updates the page table entry lock-bits by performing an atomic operation to set the page table entry lock-bits to the new value. In this manner, the page table entry is properly locked with the lock-bits combination derived from the history of the system reset exception occurrences. Therefore, if a page table entry is properly locked (e.g., PTE_LOCK[0:1]=0b01 and SREB[0: 1]=0b00), and a system reset exception occurs immediately, the page table entry will not be treated as locked since the new SREB[0:1] is 0b01, but the PTE_LOCK[0:1] is still 0b01 which is now a wrong lock-bit combination. When the software wants to reuse this PTE entry for a new virtual address translation, rather than encountering a deadlock situation, the software will be able to update the PTE as well as clear up the bad lock combination upon releasing the PTE.

Next, a determination is then made as to whether the page table entry lock-bits update was successful (step 418). If not, the process returns to step 412. If the update was successful, the page table entry is further updated with translation information (step 420). This update in step 420 is further controlled by the V-bit of the PTE in a prior act. If the V-bit is set, the update cannot be performed and the processor releases the PTE and locates another PTE to use. After the page table entry is updated, the PTE is released so that the page table entry lock-bits are cleared to 00, i.e., PTE_LOCK[0:1]=0b00 (step 422).

Thus, the present invention provides a mechanism for avoiding deadlocks due to the occurrence of a system reset exception during a call to a shared resource. The mechanism of the present invention utilizes both available lock-bits in the page table entry to resolve the deadlocked page table entry condition. The present invention forces the software to use different lock-bits combinations based on the number of occurrences of system reset exceptions. A page table entry will be in a locked state if the lock-bits for the page table entry are set to the designated combination based on the history of the occurrence of system reset exceptions. In this manner, a processor is not able to obtain an indefinitely held lock on the system resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for changing a lock-bits combination in a software lock to resolve a deadlock of a particular subset of a memory region within the data processing system, comprising:
   receiving a system reset exception;
   identifying the lock-bits combination to use in the software lock, wherein the lock-bits combination is identified based on a value of system reset exception occurrence bits retrieved from a memory location; and
   updating the software lock that is maintained in another memory location with the identified lock-bits combination, wherein updating the software lock allows the data processing system to resolve the deadlock of the particular subset of the memory region without resetting the software lock to an initial state.

2. The method of claim 1, wherein the another memory location is an entry in a page table used to facilitate virtual to physical address translation.

3. The method of claim 1, further comprising:
   at least one of performing a system reboot based on the value in the system reset exception occurrence bits and shutting down the data processing system based on the value in the system reset exception occurrence bits.

4. The method of claim 1, further comprising:
   responsive to a determination that the system reset exception has been registered by an operating system with the operating system's reset vector, transferring control of the system reset exception from a system firmware reset handler to an operating system reset handler.

5. The method of claim 1, wherein the value of the system reset exception occurrence bits is based on a history of a plurality of system reset exception occurrences.

6. The method of claim 5, wherein the system reset exception occurrence bits are incremented to reflect the number of system reset exceptions that have occurred.

7. The method of claim 1, wherein resolving the deadlock allows the data processing system to reuse the resource.

8. The method of claim 1, wherein updating the value in the system reset exception occurrence bits is performed by a system firmware reset handler.

9. The method of claim 1, wherein the system reset exception occurrence bits are stored in a special purpose register.

10. The method of claim 1, wherein software reads the system reset exception occurrence bits to identify the lock-bits combination to use in the software lock.

11. The method of claim 1, wherein updating the software lock allows a process to establish exclusive ownership of and update the resource.

12. The method of claim 11, wherein the software lock is released after the resource is updated.

13. A data processing system for changing a lock-bits combination in a software lock to resolve a deadlock of a particular subset of a memory region within the data processing system, comprising:
   receiving means for receiving a system reset exception;
   identifying means for identifying the lock-bits combination to use in the software lock, wherein the lock-bits combination is identified based on a value of system reset exception occurrence bits retrieved from a memory location; and
   updating means for updating the software lock that is maintained in another memory location with the identified lock-bits combination, wherein updating the software lock allows the data processing system to resolve the deadlock of the particular subset of the memory region without resetting the software lock to an initial state.

14. The data processing system of claim 13, wherein the another memory location is an entry in a page table used to facilitate virtual to physical address translation.

15. The data processing system of claim 13, further comprising:
   at least one of performing means for performing a system reboot based on the value in the system reset exception occurrence bits and shutting means for shutting down the data processing system based on the value in the system reset exception occurrence bits.

16. The data processing system of claim 13, further comprising:
   transferring means, responsive to a determination that the system reset exception has been registered by an operating system with the operating system's reset vector, for transferring control of the system reset exception from a system firmware reset handler to an operating system reset handler.

17. The data processing system of claim 13, wherein the value of the system reset exception occurrence bits is based on a history of a plurality of system reset exception occurrences.

18. The data processing system of claim 17, wherein the system reset exception occurrence bits are incremented to reflect the number of system reset exceptions that have occurred.

19. The data processing system of claim 13, wherein resolving the deadlock allows the data processing system to reuse the resource.

20. The data processing system of claim 13, wherein updating the value in the system reset exception occurrence bits is performed by a system firmware reset handler.

21. The data processing system of claim 13, wherein the system reset exception occurrence bits are stored in a special purpose register.

22. The data processing system of claim 13, wherein software reads the system reset exception occurrence bits to identify the lock-bits combination to use in the software lock.

23. The data processing system of claim 13, wherein updating the software lock allows a process to establish exclusive ownership of and update the resource.

24. The data processing system of claim 23, wherein the software lock is released after the resource is updated.

25. A computer program product encoded in a tangible computer readable medium for changing a lock-bits combination in a software lock to resolve a deadlock of a particular subset of a memory region within the data processing system, comprising:
   first instructions for receiving a system reset exception;
   second instructions for identifying the lock-bits combination to use in the software lock, wherein the lock-bits combination is identified based on a value of system reset exception occurrence bits retrieved from a memory location; and
   third instructions for updating the software lock that is maintained in another memory location with the identified lock-bits combination, wherein updating the software lock allows the data processing system to resolve the deadlock of the particular subset of the memory region without resetting the software lock to an initial state.

26. The computer program product of claim 25, wherein the another memory location is an entry in a page table used to facilitate virtual to physical address translation.

27. The computer program product of claim 25, further comprising:
   at least one of fourth instructions for performing a system reboot based on the value in the system reset exception occurrence bits and fifth instructions for shutting down the data processing system based on the value in the system reset exception occurrence bits.

28. The computer program product of claim 25, further comprising:
   fourth instructions, responsive to a determination that the system reset exception has been registered by an operating system with the operating system's reset vector, for transferring control of the system reset exception from a system firmware reset handler to an operating system reset handler.

29. The computer program product of claim 25, wherein the value of the system reset exception occurrence bits is based on a history of a plurality of system reset exception occurrences.

30. The computer program product of claim 29, wherein the system reset exception occurrence bits are incremented to reflect the number of system reset exceptions that have occurred.

31. The computer program product of claim 25, wherein resolving the deadlock allows the data processing system to reuse the resource.

32. The computer program product of claim 25, wherein updating the value in the system reset exception occurrence bits is performed by a system firmware reset handler.

33. The computer program product of claim 25, wherein the system reset exception occurrence bits are stored in a special purpose register.

34. The computer program product of claim 25, wherein software reads the system reset exception occurrence bits to identify the lock-bits combination to use in the software lock.

35. The computer program product of claim 25, wherein updating the software lock allows a process to establish exclusive ownership of and update the resource.

36. The computer program product of claim 35, wherein the software lock is released after the resource is updated.

* * * * *